Sept. 25, 1956 L. T. McGEE 2,764,248
HYDRAULIC STEERING MECHANISM FOR VEHICLES
HAVING VARIABLE TREAD STEERABLE WHEELS
Filed Oct. 15, 1953 2 Sheets-Sheet 1
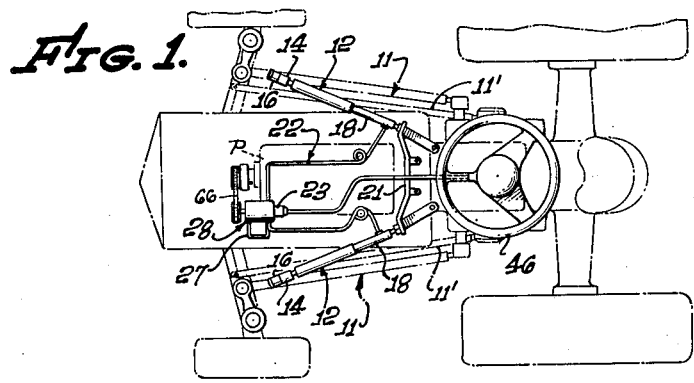
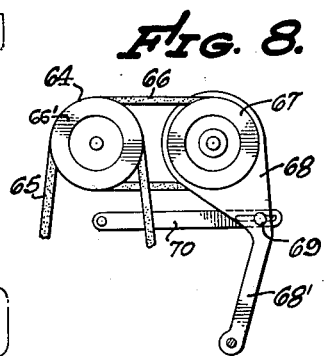
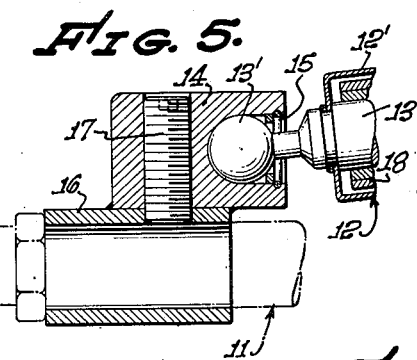
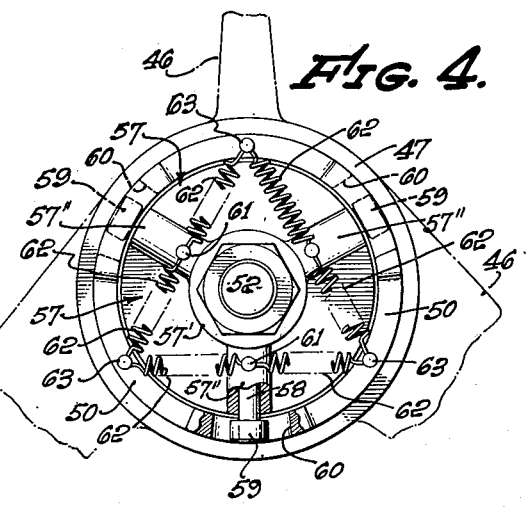
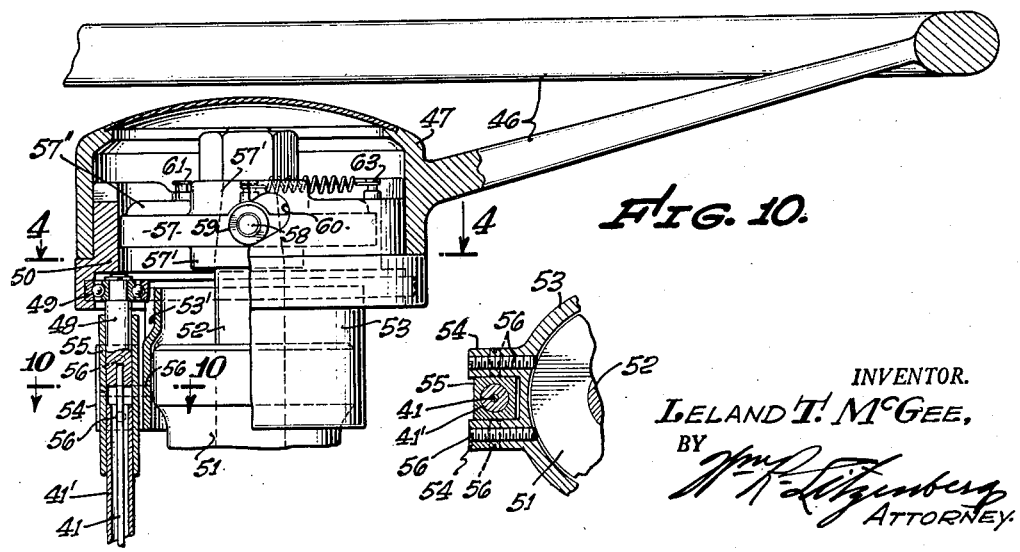
INVENTOR.
LELAND T. McGEE,
BY
ATTORNEY.

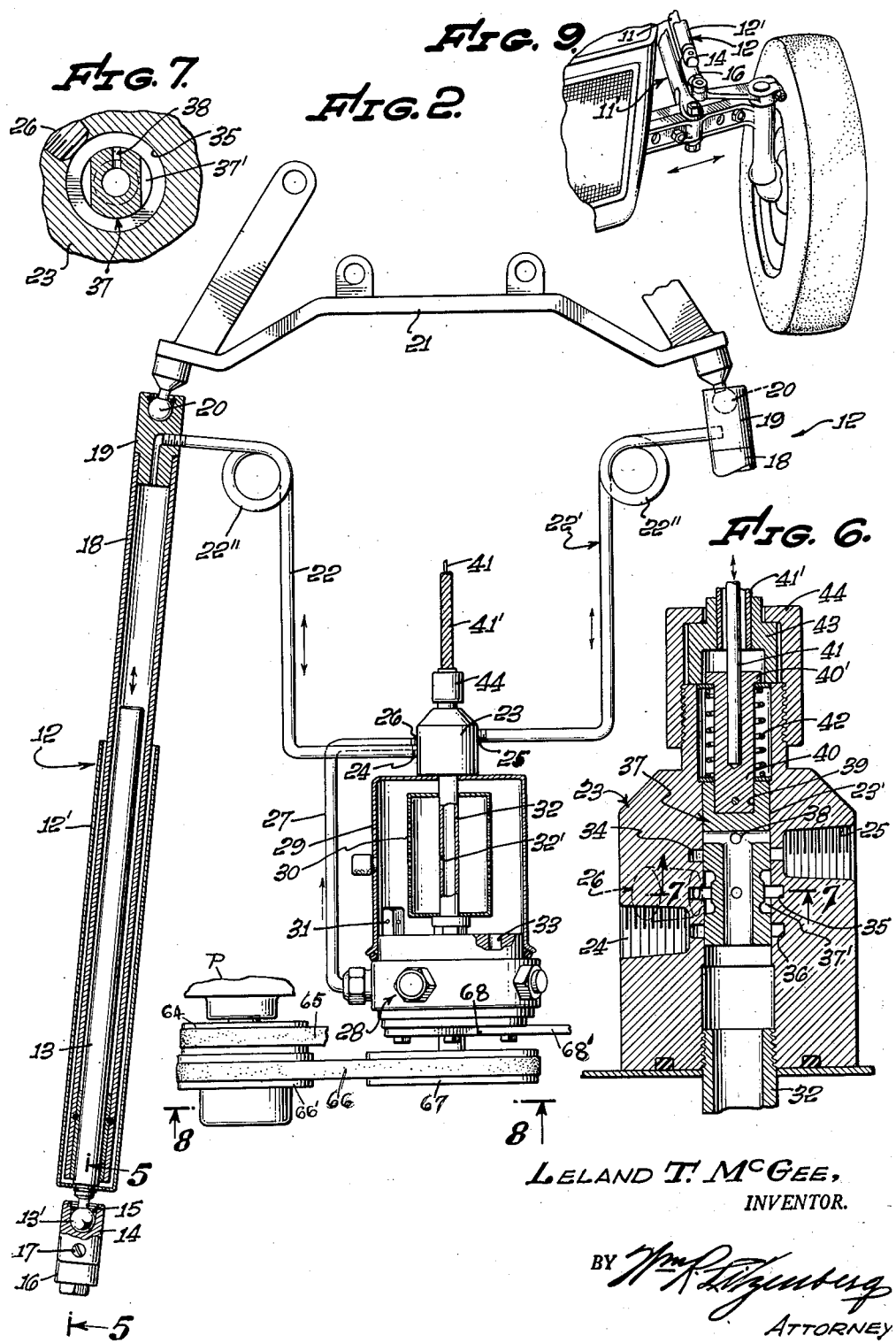

United States Patent Office 2,764,248
Patented Sept. 25, 1956

2,764,248

HYDRAULIC STEERING MECHANISM FOR VEHICLES HAVING VARIABLE TREAD STEERABLE WHEELS

Leland T. McGee, Compton, Calif.

Application October 15, 1953, Serial No. 386,357

3 Claims. (Cl. 180—79.2)

This invention relates to hydraulic steering mechanism for tractors, trucks and the like, and more particularly to a hydraulic steering unit which can be substituted for the usual hand wheel steering mechanism thereon.

Among the salient objects of the present invention are:

To provide a combination steering wheel and cap, both movable axially, with valve-actuating mechanism, movable therewith, for operating hydraulic control valves;

To provide in such a mechanism, means whereby the neutral position of the hydraulic control valve and the neutral position of the steering wheel, are inter-connected and timed to operate together;

To provide a hydraulic steering mechanism of the character referred to in which the hydraulic cylinders and their connections to the tie rods of the tractor or truck wheels are made to the regular tie rods of the tractor or truck, thus simplifying the connection of my hydraulic mechanism, said hydraulic cylinders and their connections being such that any adjustment of the tractor wheels outwardly to widen the tread, or inwardly, makes no difference as to the connections, for any variation in the length of the connection is compensated for by the telescopic action of the cylinders and their plungers operating therein;

To provide in such a hydraulic steering mechanism a valve mechanism which is removed from proximity to the steering wheel, and is controlled by means of a flexible cable extended thereto from the steering wheel, and in which the pump, oil reservoir, filter, and control valves are contained in one unit;

To provide an improved operating cable connection from the steering wheel and its supporting cap to the control valve, and in which the valve control cable roller is timed or synchronized with the hand wheel's neutral position;

To provide an improved hydraulic steering mechanism of the character referred to which can be packaged as a unit, and which can be substituted for the usual hand wheel steering mechanism without altering or changing of any tractor parts in order to make the substitution of hydraulic steering wheel for the usual hand steering wheel.

Other objects and advantages of the invention will appear from the following more detailed description of one practical embodiment thereof, taken with the accompanying two sheets of drawings illustrating the same:

Figure 1 is a plan view of a tractor, shown in light broken lines, with my new hydraulic steering mechanism applied thereto;

Figure 2 is an enlarged plan view, with parts broken away, and showing one of the hydraulic cylinders and plunger, in section, and its connections, together with the unit which includes the pump, oil reservoir, filter, relief valve, and tube connections, and the connection for driving the pump;

Figure 3 is an enlarged fragmentary view, partly in section, showing the hand wheel and its connecting cap, which are substituted for the hand wheel originally on the tractor;

Figure 4 is a fragmentary plan view, showing the springs and their connections for moving and holding the hand wheel yieldingly in a neutral position, taken on line 4—4, on Fig. 3;

Figure 5 is a detail, partly in section, on line 5—5, Fig. 2, showing how my operating cylinders and their plungers are connected with the regular steering links for turning the tractor wheels in the steering action;

Figure 6 is an enlarged, longitudinal sectional view of the control valve mechanism;

Figure 7 is a cross sectional view, taken on line 7—7, Fig. 6;

Figure 8 is a view as seen at line 8—8 on Fig. 2, showing a pivoted arm, with pin and slot connection, for adjusting a belt drive;

Figure 9 is a fragmentary front elevation of a tractor, to show the mechanism for moving the front wheel connection thereof outwardly or inwardly without changing the connection of the operating hydraulic cylinder and plunger thereto; and Figure 10 is a cross sectional view, on line 10—10, Fig. 3.

Referring in detail to the drawings, Fig. 1, I have indicated in light broken lines the body and wheels of a tractor. In this view the regular steerings links 11, 11 are shown in light broken lines, as are also the connecting radius rods, designated 11', 11'. These are regular connections and are not disturbed or disconnected in order to apply my improved hydraulic steering mechanism thereto.

My hydraulic cylinders, with their plungers, are designated as a whole 12, 12. Each includes an outer cylinder 12', Fig. 5, with the end of a plunger 13, secured in its closed end, said plunger terminating in a ball 13', held in a socket member 14, and held in place by an insert ring 15, or any other suitable manner. Said socket member 14 has a short sleeve 16, as a part thereof, adjustably secured on the regular link 11, and fastened by an insert screw 17, as seen in Fig. 5.

A telescoping tube or cylinder 18, moves within said outer cylinder 12', Fig. 2, over the plunger 13, and is provided in its upper end with an insert plug 19, with ball and socket connection 20, connecting it with a supporting frame or bracket 21, the opposite side of which has provision for the other hydraulic cylinder, as indicated. Said bracket 21 is secured to the body of the tractor, as indicated in Fig. 1. Thus said hydraulic cylinders and their plungers are pivotally connected at their opposite ends, with ball and socket connections, to the fixed frame brackets and with the regular steering links 11, 11 of the tractor and move freely therewith in the usual steering movements.

Two spring tubes, as 22, 22', are shown connected through the end plugs 19, 19, for supplying hydraulic fluid to said cylinders, said spring tubes having coils, as 22" formed therein, to yield in any lateral movements required in connection with the lateral movements of said hydraulic cylinders. The opposite ends of said tubes 22, 22' are shown connected at 24 and 25 to the opposite sides of a valve body, designated as a whole 23.

Said valve body 23 is shown in enlarged sectional view in Fig. 6, which also shows the tube connections 24 and 25 of tubes 22 and 22'. There is also shown, connected thereto, as at 26, a pump tube 27, from a pump 28, connected with a reservoir 29, having a filter 30, and a relief valve 31 therein.

A pipe 32 extends from said valve housing 23, through said reservoir and said filter, and is connected with said pump 28, said pipe having an outlet 32' in its side, discharging into said filter and thence into said reservoir. An inlet 33 from said reservoir to said pump 28 is indicated in Fig. 2.

Referring to Fig. 6, said valve body 23 has a passageway 23' therethrough, with three annular, inwardly opening channels, as 34, 35 and 36 formed therein, Fig. 6. Channel 34 is shown connected with tube connection 25; channel 36 is shown connected with tube connection 24, and the pump tube 27 is shown connected with channel 35, to supply hydraulic fluid from the reservoir by means of the pump 28 to said connection 26, and thence to said annular, inwardly opening channel 35, to be directed to the other channels 34 or 36 and to their respective tubes 22 and 22', depending upon the position of the control valve member, designated 37. Said control valve member 37 has formed in its side an annular connecting chamber or pocket, designated 37', designed to connect channels 34 and 35, when moved upwardly, and to connect channels 35 and 36 when moved downwardly, thus putting the pump supply from channel 35 and into the connection with either channel 34, through connection 25 with tube 22', or with channel 36, through its connection 24, with tube 22, which tubes 22 and 22' are connected to the operating cylinders 12, 12.

Said control valve member 37 has transverse ports therethrough, designated 38. The upper end of said valve member 37 has a bore or pocket 39 formed therein to receive the end of a member 40 to be secured therein and which member 40 is secured to the end of an operating cable 41, extending through an outer tube or wrapping 41'. A coiled spring 42 on said member 40 bears at its lower end upon the upper end of the valve member 37, and at its upper end underlies a flange-like portion 40' on said member 40, as shown. Thus when said wire or cable 41 is moved downwardly, it moves the member 40 and the control valve 37 downwardly against the tension of said spring 42, and when released, said spring returns said valve 37 to its normal position, as shown in full lines. Covering or enclosure caps, as 43 and 44 are shown in section in Fig. 6.

Referring now to Fig. 3, which shows a portion of a hand steering wheel, as 46, with a cap portion 47 in its center, I will describe how this steering wheel and its cap are moved axially as they are turned, and with connections to the operating cable 41 to the control valve.

A short shaft or member, as 48, has a ball bearing connection, or mounting, as at 49, in an annular casting 50, shown partly in section at said connection, and over which wheel cap 47 fits, as indicated. The usual steering column is designated 51, through which extends the steering shaft 52. Around said shaft and said column, in a short sleeve 53, having an indent, as 53', in its top at one side, to give clearance for said ball-bearing and shaft at 48—49. Said sleeve 53 also has formed on its side two spaced lug-like portions, as 54, 54, to receive therebetween, a square member 55, through which the operating wire or cable 41 and its covering 41' extends, as indicated in Fig. 10. Set screws, as 56, 56, are shown for securing said parts together in assembled, operative positions.

Mounted on the steering shaft 52, in the wheel cap 47, is a wheel or disc-like member 57, having hub portions, as 57', said member 57 also having three radially disposed thickened portions, as 57", into the outer ends of which are three short shafts 58, with roller elements 59 thereon, operable back and forth in recesses 60 formed in the annular casting 50, as seen in Fig. 4.

Screw bolts, as 61, are set in the thickened portions 57" so that their inner ends form stops for the short shafts 58, Fig. 4. Said screw bolts or studs 61 have connected therewith coiled springs, as 62, the opposite ends of each of said springs being connected to similar screw bolts or studs, as 63, 63, on the annular member 50, whereby said connected coil springs 62, 62, by reason of their connections, operate automatically to return and yieldingly hold said steering wheel 46, and its connections, in neutral positions.

In Fig. 8 I have shown a face view of the mechanism for supporting and adjusting the pump, reservoir and valve unit. A supporting arm or lever 68, supports at its upper, larger end, the pump, reservoir and valve mechanism unit, as will be understood from Fig. 2, which is a plan view looking down on it, and in which the pulley 67 which drives the pump 28, is also seen with belt 66 therefrom to a driving pulley 66'. Said arm or lever 68 is pivotally mounted at 68' on a part of the frame below, with an adjustment link 70, having its end connected with said arm or lever 68 by means of a slot and pin at 69, whereby said supporting arm 68 has a limited adjustment movement for tightening the belt 66, which drives the hydraulic pump 28. The power plant of the tractor is designated P, and its driving pulley is designated 64, with the belt therefrom designated 65, as seen in Fig. 2.

Thus the hydraulic pump, reservoir, with filter therein, and control valve mechanism, as a unit, are adjustably supported in the vicinity of the power plant of the tractor, and the valve mechanism is actuated by a cable extended thereto from the steering wheel, as before referred to. The turning of the steering wheel operates through the angular recesses 60, operating on the roller elements 59, as before described, to move the steering wheel and its supporting cap, and its connections with the cable 41, to actuate the control valve mechanism, as before described.

I do not limit the invention to the details of construction and arrangement here shown for explanatory purposes, except as I may be limited by the hereto appended claims forming a part of this application.

I claim:

1. A hydraulic steering mechanism for heavy vehicles having regular steering links and variable tread front wheels which includes a steering wheel with a central portion having therein means for moving said steering wheel axially as it is turned on its axis, hydraulic cylinders, with plungers operable therein, connected at one end to a fixed part of the vehicle and at their other ends connected to a portion of the steering mechanism for moving the traction wheels of the vehicle in steering it, said hydraulic cylinders being in two parts with one part telescoping within the other part to compensate for change of radius as the front wheels are spread to increase or decrease the width of the tread, a source of hydraulic fluid with connections with said cylinders for furnishing the operating fluid for said plungers, control valve mechanism for controlling the flow of fluid to said cylinders, and an operating cable from said valve mechanism to said steering wheel, and movable lengthwise to actuate said valve mechanism as said steering wheel is turned and moved axially.

2. A hydraulic steering mechanism as set forth in claim 1 in which the operating ends of the cylinders and plungers are connected directly on to the regular steering links, whereby to avoid disconnecting the regular steering connections.

3. A hydraulic steering mechanism for tractors, including a steering wheel for operating steering links connected with variable tread front wheels of the tractor, comprising: means for causing axial movement of said steering wheel as it is turned in steering said tractor; two hydraulic cylinders with plungers therein, each cylinder consisting of two telescoping parts, one part of each cylinder being connected at one end to a rigid part of the tractor, and the other part of each being connected at one of its ends with the respective steering links connected with the front wheels whereby to compensate for change of radius as the front wheels are adjusted axially to increase or decrease the width of the tread thereof; a hydraulic pump and valve control mechanism for supplying hydraulic fluid to said cylinders; and cable connections from said steering wheel to said valve mechanism for operating the same to control hydraulic fluid to said cylinders, whereby the turning of said steering wheel and its axial movement operates to move said cable lengthwise to actuate said valve mechanism.

References Cited in the file of this patent

UNITED STATES PATENTS

| | | |
|---|---|---|
| 1,774,634 | Coates | Sept. 2, 1930 |
| 2,193,898 | Carter et al. | Mar. 19, 1940 |
| 2,557,936 | Brown | June 26, 1951 |